(12) United States Patent
Cole et al.

(10) Patent No.: US 8,645,232 B1
(45) Date of Patent: Feb. 4, 2014

(54) SYSTEM AND METHOD FOR THRESHOLD BILLING FOR RETURNED GOODS

(75) Inventors: Michael McWayne Cole, Clemmons, NC (US); Revel Paul Young, II, Winston-Salem, NC (US); Sean McCarthy, Frisco, TX (US); Nicolas Pellegrino, Acworth, GA (US)

(73) Assignee: Inmar, Inc., Winston-Salem, NC (US)

( * ) Notice: Subject to any disclaimer, the term of this patent is extended or adjusted under 35 U.S.C. 154(b) by 187 days.

(21) Appl. No.: 12/651,179

(22) Filed: Dec. 31, 2009

(51) Int. Cl.
*G06Q 10/00* (2012.01)
*G06F 17/60* (2006.01)

(52) U.S. Cl.
USPC .................................................. 705/28; 705/1

(58) Field of Classification Search
USPC .......................................................... 705/28
See application file for complete search history.

(56) References Cited

U.S. PATENT DOCUMENTS

| | | | |
|---|---|---|---|
| 6,085,172 A | 7/2000 | Junger | |
| 6,473,740 B2 | 10/2002 | Cockrill et al. | |
| 6,536,659 B1 | 3/2003 | Hauser | |
| 6,754,637 B1 | 6/2004 | Stenz | |
| 6,832,263 B2 | 12/2004 | Polizzi | |
| 6,834,268 B2 | 12/2004 | Junger | |
| 7,050,995 B2 | 5/2006 | Wojcik | |
| 7,076,449 B2 | 7/2006 | Tsunenari et al. | |
| 7,124,941 B1 | 10/2006 | OConnell | |
| 7,139,731 B1 | 11/2006 | Alvin | |
| 7,346,577 B1 | 3/2008 | Williams et al. | |
| 7,376,572 B2 | 5/2008 | Siegel | |
| 7,415,431 B2 | 8/2008 | Pintsov | |
| 7,428,988 B1 | 9/2008 | Starr | |
| 7,455,226 B1 | 11/2008 | Hammond | |
| 7,912,773 B1 | 3/2011 | Subramanian | |
| 8,032,409 B1* | 10/2011 | Mikurak | 705/14.26 |
| 2001/0037207 A1 | 11/2001 | Dejaeger | |
| 2001/0047315 A1 | 11/2001 | Siegel | |

(Continued)

FOREIGN PATENT DOCUMENTS

GB    2397663    7/2004

OTHER PUBLICATIONS

"Returns Management Solutions Provider Swift Rivers", Business Technology Editors, Business Wire, New York, Dec. 5, 2001. p. 1.*

(Continued)

*Primary Examiner* — Garcia Ade
(74) *Attorney, Agent, or Firm* — Myers Bigel Sibley & Sajovec, P.A.

(57) ABSTRACT

A system, a method, and computer readable medium for threshold billing of returned items. Billing threshold rules are established and stored in a computer memory and are associated with returned items. A returned item is identified and a computer processor determines if a billing threshold rule has been associated with the returned item. If so, the processor assigns the returned item to a container based on a billing threshold rule associated with the returned item. Information indicating the container to which the returned item has been assigned is stored in the computer memory. The processor determines if the billing threshold amount for the returned item has been reached. If so, the processor determines the status of the container to which the returned item has been assigned. If the container to which the returned item has been assigned is not closed, the processor generates a notification to physically close the container and also generates an invoice to the product vendor for the returned items for which the billing threshold amount has been reached.

18 Claims, 7 Drawing Sheets

(56) References Cited

U.S. PATENT DOCUMENTS

| | | |
|---|---|---|
| 2002/0010634 A1 | 1/2002 | Roman et al. |
| 2002/0019785 A1 | 2/2002 | Whitman |
| 2002/0049622 A1* | 4/2002 | Lettich et al. ............ 705/7 |
| 2003/0110088 A1 | 6/2003 | Starmer |
| 2003/0225625 A1 | 12/2003 | Chew |
| 2004/0019494 A1 | 1/2004 | Ridgeway et al. |
| 2004/0088225 A1 | 5/2004 | Foth |
| 2004/0143517 A1 | 7/2004 | Tsai |
| 2004/0143518 A1 | 7/2004 | Siegel |
| 2004/0193438 A1* | 9/2004 | Stashluk et al. ............ 705/1 |
| 2005/0015315 A1 | 1/2005 | Starkowsky et al. |
| 2005/0080635 A1 | 4/2005 | Groff |
| 2005/0144099 A1 | 6/2005 | Deb et al. |
| 2005/0216368 A1 | 9/2005 | Wechsel |
| 2005/0222911 A1 | 10/2005 | Kerker |
| 2005/0283463 A1 | 12/2005 | Dill |
| 2006/0015363 A1* | 1/2006 | Allu et al. ............ 705/1 |
| 2006/0149577 A1 | 7/2006 | Stashluk |
| 2006/0277110 A1 | 12/2006 | Witter |
| 2007/0239569 A1 | 10/2007 | Lucas |
| 2007/0282743 A1 | 12/2007 | Lovelett |
| 2008/0010189 A1 | 1/2008 | Rosenberger |
| 2008/0154677 A1 | 6/2008 | Casey |
| 2008/0222001 A1 | 9/2008 | Kunieda |
| 2009/0076870 A1 | 3/2009 | Hammond |
| 2009/0138562 A1 | 5/2009 | Schmulen |
| 2009/0281935 A1 | 11/2009 | Junger |
| 2010/0312884 A1 | 12/2010 | Nandy |

OTHER PUBLICATIONS

Business/Technology Editors, "Returns Management Solutions Provider. Inc. Raises $3.6 Million in Series B Financing," Business Wire, New York, Dec. 5, 2001, p. 1.

ModusLink Global Solutions, Inc. Hoover's Company Records, Austin: Jun. 15, 2009., Iss. Mm-Mz; p. 16748.

U.S. Appl. No. 12/533,589, filed Jul. 31, 2009, System and Method for Storing and Displaying Returned Goods Information, Keven R. Goode.

U.S. Appl. No. 12/842,790, filed Jul. 23, 2010, Computer Based System and Method and Computer Program for Processing Return Authorization Requests, Anita Minnella.

U.S. Appl. No. 12/651,179, filed Dec. 31, 2009, System and Method for Threshold Billing for Returned Goods, Michael McWayne Cole.

U.S. Appl. No. 12/533,589, filed Jul. 31, 2009, System and Method for Storing and Displaying Returned Goods Information, Sean McCarthy.

U.S. Appl. No. 12/842,790, filed Jul. 23, 2010, Computer Based System and Method and Computer Program Product for Processing Return Authorization Requests, Anita Marie Minnella.

U.S. Appl. No. 12/651,176, filed Dec. 31, 2009, System and Method for Threshold Billing for Returned Goods, Michael McWayne.

* cited by examiner

SYSTEM AND METHOD FOR THRESHOLD BILLING FOR RETURNED GOODS

FIELD OF THE INVENTION

The present invention generally relates to a computer-based system, method and computer readable medium comprising software for threshold billing for returned goods.

BACKGROUND OF THE INVENTION

Reverse logistics is the process by which goods and materials are returned to a product vendor by a product distributor, such as a retailer, flowing backwards through the supply chain for the purpose of recapturing value and/or proper disposal. Reverse logistics involves physically transporting and disposing of returned goods, issuing accurate invoices to the product vendor for the returned goods and correctly crediting the product distributor for the returned goods.

Systems and methods for billing product vendors and crediting product distributors for returned goods are known. A disadvantage of such known systems and methods is that items may be added to a shipping container systematically, but not physically, creating a discrepancy. Such a discrepancy can also occur if items are physically added to a container but are not added systematically. In either event, amounts invoiced for the returned goods are also incorrect because they are based on the amount of items in a container systematically, that is, as stored and computed by a computer memory and processor, which can be different from the actual amount of items in the container. Incorrect invoices require further additional processing of items and reconciling actual amounts of returned items with invoiced amounts. Thus, a need exists for a system and method for processing returned items that minimizes the disadvantages associated with known returned item processing systems and methods.

SUMMARY OF THE INVENTION

A computer implemented system and method and a computer readable medium for billing a product vendor for returned items. A plurality of billing threshold rules are established and stored in a computer memory. Each of the billing threshold rules are associated with at least one of a plurality of returned items and are comprised of a billing threshold amount. A returned item is identified via a computer processor and information comprising the identity of the returned item is stored in the computer memory. The computer processor determines if a billing threshold rule has been associated with the returned item. If a billing threshold rule has been associated with the returned item, the processor assigns the returned item to a container based on a billing threshold rule associated with the returned item. Information indicating the container to which the returned item has been assigned is stored in the computer memory. The processor determines if the billing threshold amount for the returned item has been reached. If the billing threshold amount for the returned item has been reached, the processor determines the status of the container to which the returned item has been assigned. If the container to which the returned item has been assigned is not closed and the billing threshold amount for the identified item has been reached, the processor generates a notification to physically close the container. The processor also generates an invoice to the product vendor for the returned items for which the billing threshold amount has been reached. Establishing one or more billing threshold rules may include establishing and storing in the computer memory a billing threshold type for each of the plurality of billing threshold rules. Each of the billing threshold types may be a manufacturer, a vendor, a product category or an item. Establishing one or more billing threshold rules may also include establishing and storing in the computer memory information indicating whether a billing threshold amount is determined by a number of returned items or a monetary amount of returned items. An indication that the container to which the returned item was assigned is closed may be stored in the computer memory. The processor may establish a new container, and an association between the new container and the billing threshold rule with which the closed container was associated may be stored in the computer memory. The processor may facilitate the transmission of the invoice to the product vendor and the shipment of the returned items for which the billing threshold amount has reached to a specified destination.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Figure 1:
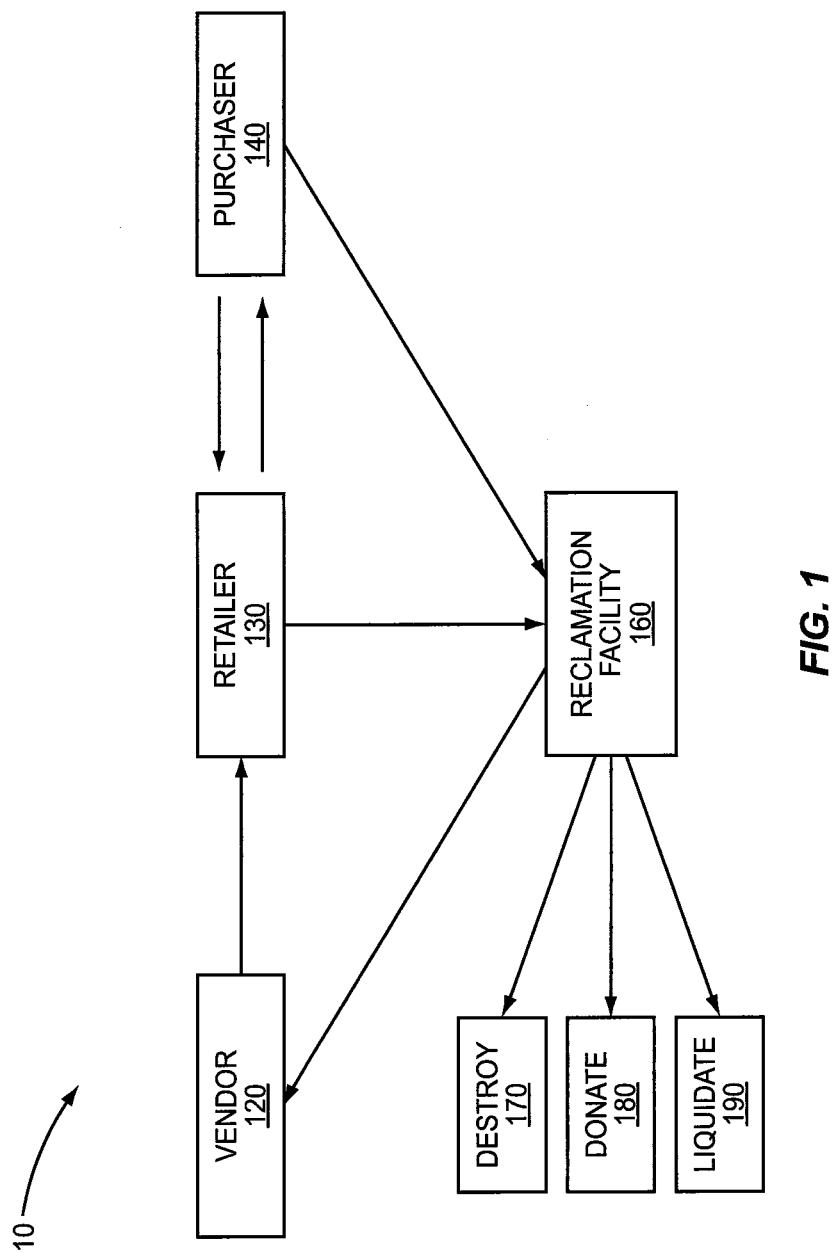
FIG. 1 is a diagram of an exemplary reverse logistics process.

FIG. 1 is a diagram of an exemplary reverse logistics process 10. The reverse logistics process may begin when, for a variety reasons, a product purchaser 140 returns a product to the product distributor such as a retailer 130. (The terms "product," "good" and "item" are used interchangeably herein.) Alternatively, the reverse logistics process may begin when a product retailer 130 returns a product to a product vendor 120. In some cases, the purchaser 140 ships or otherwise returns the product directly to the retailer 130 and the retailer 130 in turn sends the returned product to a reclamation facility 160. Alternatively, the purchaser 140 may send the returned product directly to reclamation facility 160. In either event, the product retailer 130 is, under certain conditions, entitled to a refund, exchange, or credit from the product vendor 120 for the returned product.

When the reclamation facility 160 receives the returned products/goods, it then scans a code, such as a universal product code ("UPC") for each of the returned goods, which captures items of returned goods information, which is stored in a computer memory. Reclamation facility 160 then disposes of the returned products pursuant to the instructions of the product vendor 120. Disposal of the returned goods may include return to the vendor 120, destruction 170, donation 180 or liquidation 190.

Figure 2:
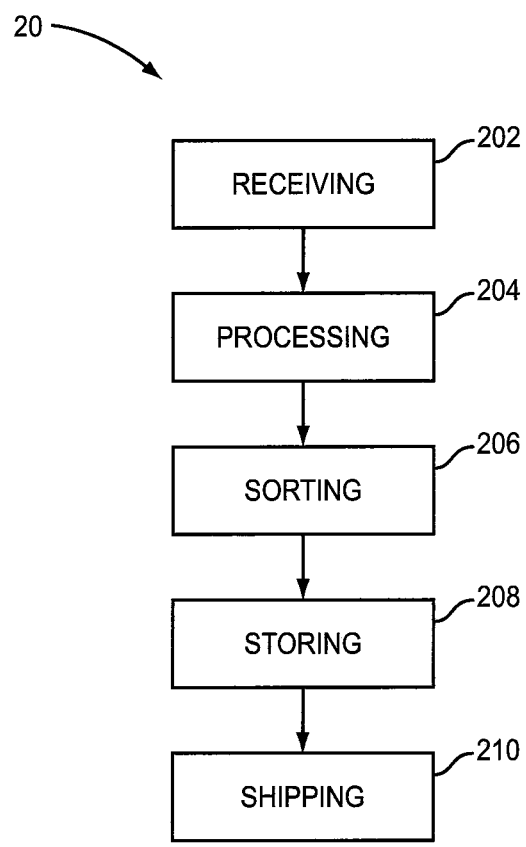
FIG. 2 is a diagram of an exemplary embodiment of the system of the present invention.

FIG. 2 is a diagram of an exemplary embodiment of system 20 of the present invention. As can be seen from FIG. 2, returned goods may be received at a receiving area 202 of a reclamation facility. Although not shown in FIG. 2, returned goods received at receiving area 202 may be separated into two staging areas. For example, a first staging area can be provided for goods to be returned to the product vendor because, for example, they were returned to a product retailer by a consumer. A second staging area can be provided for goods that are returned to a product vendor by a product retailer because the item is, for example, out-of-season or out-of-stock. Returned goods that are received at receiving area 202 may be in one or more containers that are on a pallet. In an embodiment, the goods are processed at receiving area 202 based on when they are received. For example, goods that are first received at the reclamation facility are first processed.

Continuing with FIG. 2, returned goods are moved from receiving area 202 to processing area 204. Although not shown by FIG. 2, processing area 204 may include one or more scan lines that may correspond with each of the one or more staging areas discussed above. Each scan line of processing area 204 includes a product code scanner, which are known in the art and typically include a device for acquiring the coded product information, such as a bar code scanner, which is typically connected to a computer and/or a computer network. In each scan line, a product identification code, such as a universal product code ("UPC"), for each returned product is read via a scanner to identify the returned product. The UPC information is stored, along with other information regarding the returned product, in a computer memory (not shown.) Information regarding the quantity of returned items scanned, for example, when a box of 12 identical items is scanned, also may be stored in a computer memory. While two staging areas and two scan lines have been discussed above, the invention is not limited to a particular number of staging areas and/or scan lines. The number of staging areas and scan lines can be adapted to the particular requirements of a particular returns processing system and/or method.

As shown in FIG. 2, after a returned product is scanned, the product is routed to sorting area 206, where each of the scanned returned goods are sorted by being systemically assigned to and physically placed in particular containers according to a predetermined sort pattern, which is discussed in more detail below.

After the returned products are sorted and assigned to a container, the containers of sorted products are stored in storing area 18. Containers may be stored in storing area 18 until a billing threshold has been reached and/or a container is closed. An invoice may be generated when a billing threshold has been reached and/or the container is closed or is otherwise ready for shipment. The process for determining whether a container is ready for shipment is discussed in more detail below.

Returning to FIG. 2, when a container of sorted returned goods is ready for shipping, the containers are retrieved from storing area 208 and received at shipping area 210, where the containers may be disposed of according to predetermined disposition instructions.

Figure 3:
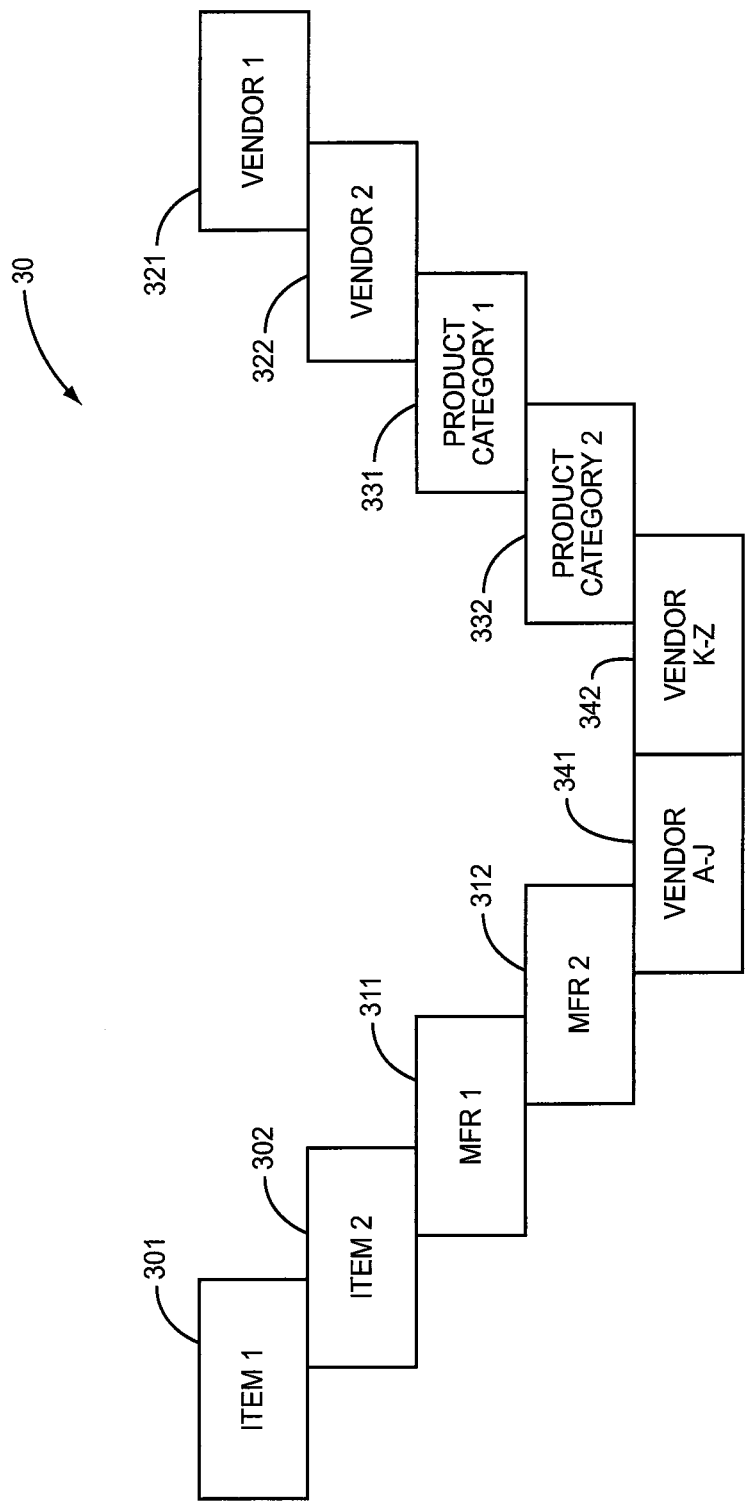
FIG. 3 is a diagram illustrating an exemplary logical sort pattern for returned items according to an exemplary embodiment of the present invention.

FIG. 3 is a diagram illustrating an exemplary logical sort pattern 30 for returned goods according to an embodiment of the present invention. As can be seen from FIG. 3, items can be sorted based on various sort criteria, such as manufacturer, vendor, product category or item. The present invention is not limited to any particular sort criteria or number of sort criteria. The particular sort criteria used can be adapted to the requirements of a particular returned goods processing system and method. In an aspect of the present invention, sort path information may be entered manually by a human and stored in a computer memory or the sort criteria may be automatically generated and/or stored in a computer memory.

Returning to FIG. 3, returned items are sorted, i.e., systematically assigned to a container according to a predetermined primary sort pattern, that is stored in a computer memory. For example, items may be assigned to a container that is associated with a particular product manufacturer, product vendor, product category or item. The assignment of a returned good to a particular container depends on the billing threshold rule established for a particular product.

As shown in FIG. 3, one or more logical and physical shipping containers 301, 302 can be provided for shipping return items (item 1 and item 2, respectively) for which a billing threshold has been established at an item level. Thus, returned items are systematically assigned to and physically placed in a container for that particular item. Similarly, one or more shipping containers 311, 312 can be provided for shipping items made by a particular manufacturer (manufacturer 1 and manufacturer 2, respectively) for which a billing threshold has been established at a manufacturer level. Thus, returned items are systematically assigned to and physically placed in a container for that particular manufacturer. Alternatively, one or more shipping containers 321, 322 can be provided for shipping items made by a particular vendor (vendor 1 and vendor 2, respectively) for which a billing threshold has been established at a vendor level. Thus, returned items are systematically assigned to and physically placed in a container for that particular vendor. A manufacturer may be comprised of one or more product vendors. For example, Sony may be a manufacturer and Sony Televisions and Sony Computers may be vendors. In addition, one or more shipping containers 331, 332 can be provided for shipping items that are in a particular product category (category 1 and category 2, respectively) for which a billing threshold has been established at a product category level. Thus, returned items are systematically assigned to and physically placed in a container for that particular product category.

Products for which no billing threshold has been established may be mass sorted according to a primary sort pattern. For example, such returned goods may be sorted to a first container 341 for returned goods for all manufacturers with names ending in the letters A-J or to a second container 342 for returned goods for all manufacturers with names ending in the letters K-Z. Such returned goods can then be sorted according to a secondary sort pattern, where each such returned good is sorted to a container that is associated with a particular manufacturer.

As can be appreciated, the invention is not limited to any particular type of billing threshold, sort pattern or configuration of physical containers. The level (e.g., item, vendor, manufacturer, product category, etc.) at which a billing threshold may be established, the sort pattern and the number and configuration of physical containers may be based on the particular requirements of a particular returned goods processing system, manufacturer, vendor, retailer, reclamation facility or combination thereof.

When a returned item is assigned to a container, based on the type of billing threshold established for the item, an indication of the container to which the returned item has been assigned is stored in a computer memory.

Figure 4:
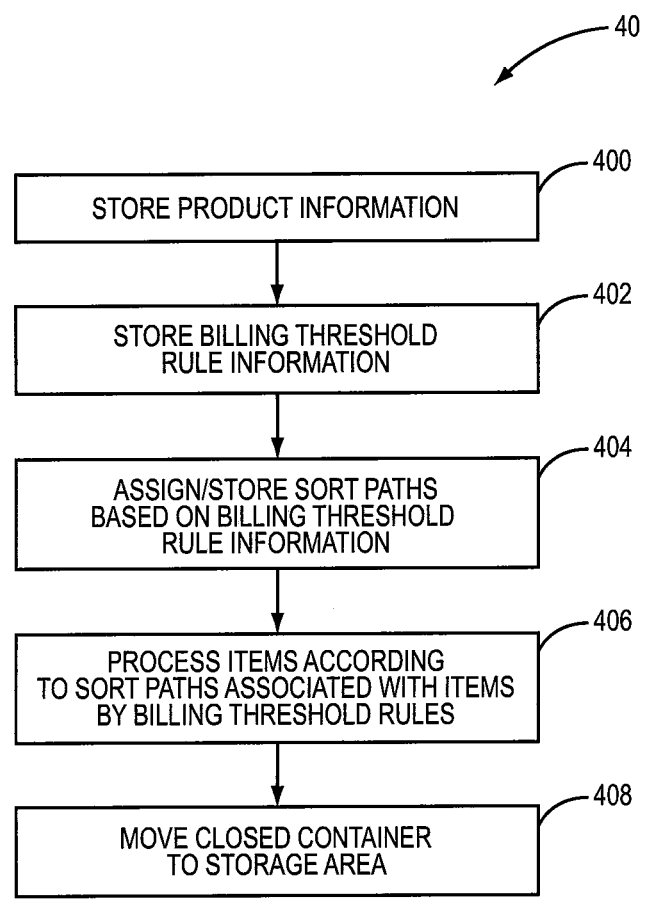
FIG. 4 is a high level flow chart illustrating a process for processing returned items in an exemplary embodiment of the present invention.

FIG. 4 is a high level flow chart illustrating a process 40 for processing returned items in an exemplary embodiment of the present invention. As can be seen from FIG. 4, in block 400, product information is stored in a computer memory. The product information may be comprised of information that may be received from a product retailer by a returned goods processor at a predetermined interval, e.g., daily. The product information may comprise information about products sold by that retailer and, therefore, products that may be returned to a returned goods processor. Product information may include, for example, information identifying the product (e.g., stocking keeping unit ("SKU") number), the one or more stores that sell the product, the product vendor, manufacturer and/or category. The product information may be stored in a computer memory and may be manually entered and stored and/or automatically received and stored. Processing control is then transferred to block 402.

In block 402, billing threshold rule information is stored in a computer memory. Billing threshold rule information may be received from a product retailer by a returned goods processor. Billing threshold information may include, for each product, a billing threshold group type and a billing threshold amount. The specific items of information comprising the billing threshold rule information is discussed in more detail below. Like the product information, the billing threshold rule information is stored in a computer memory and may be manually entered and stored and/or automatically received and stored. Processing control is then transferred to block 404.

In block 404, sort patterns or paths are determined for items based on the billing threshold rule information, and the determined sort path information is stored in a computer memory. Processing control is then transferred to block 406. A sort path may be assigned to or associated with a specific billing threshold rule. Exceptions may be provided for billing threshold rules that are defined by custom field, e.g., product category, or an item. An item may belong only to one sort path and therefore only one billing threshold rule. A sort path may not be unique to a particular reclamation facility. An exemplary logical sort pattern is discussed above in connection with FIG. 3.

Figure 6:
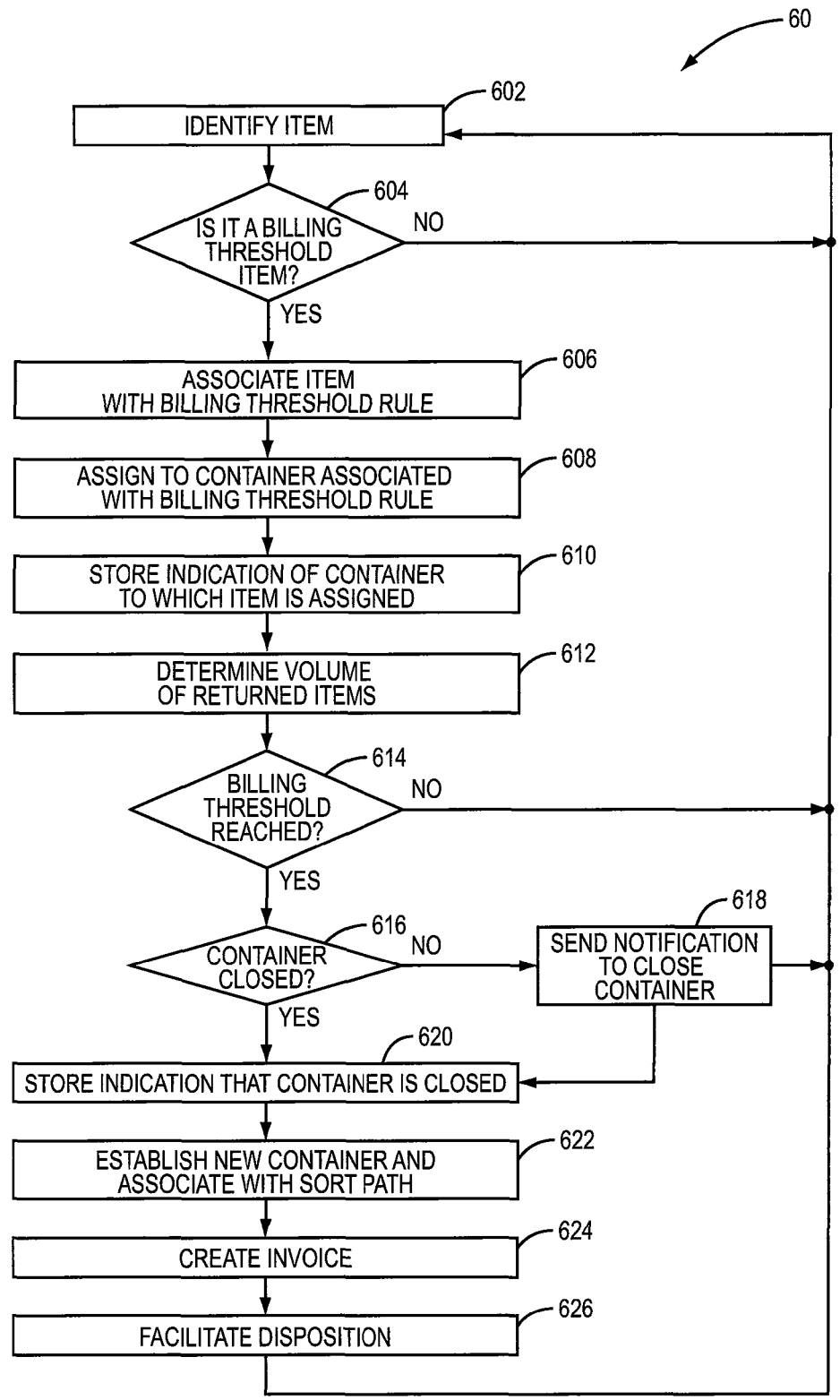
FIG. 6 is a more detailed flow chart illustrating a process for processing returned items in an exemplary embodiment of the present invention.

In block 406, returned items are processed according to the sort path associated with each returned item. Such processing includes assigning returned items to specific containers associated with a sort path. As can be appreciated, when a container associated with a particular sort path is closed, because it is full or a billing threshold has been reached, a new container is established and associated with that particular sort path. FIG. 6 illustrates the processing of returned items in more detail. Processing control is then transferred to block 408.

In block 408, the (closed) container may be moved to a storage area until the container is ready to be shipped. An indication that the closed container has been moved to a storage area is stored in a computer memory.

Figure 5:
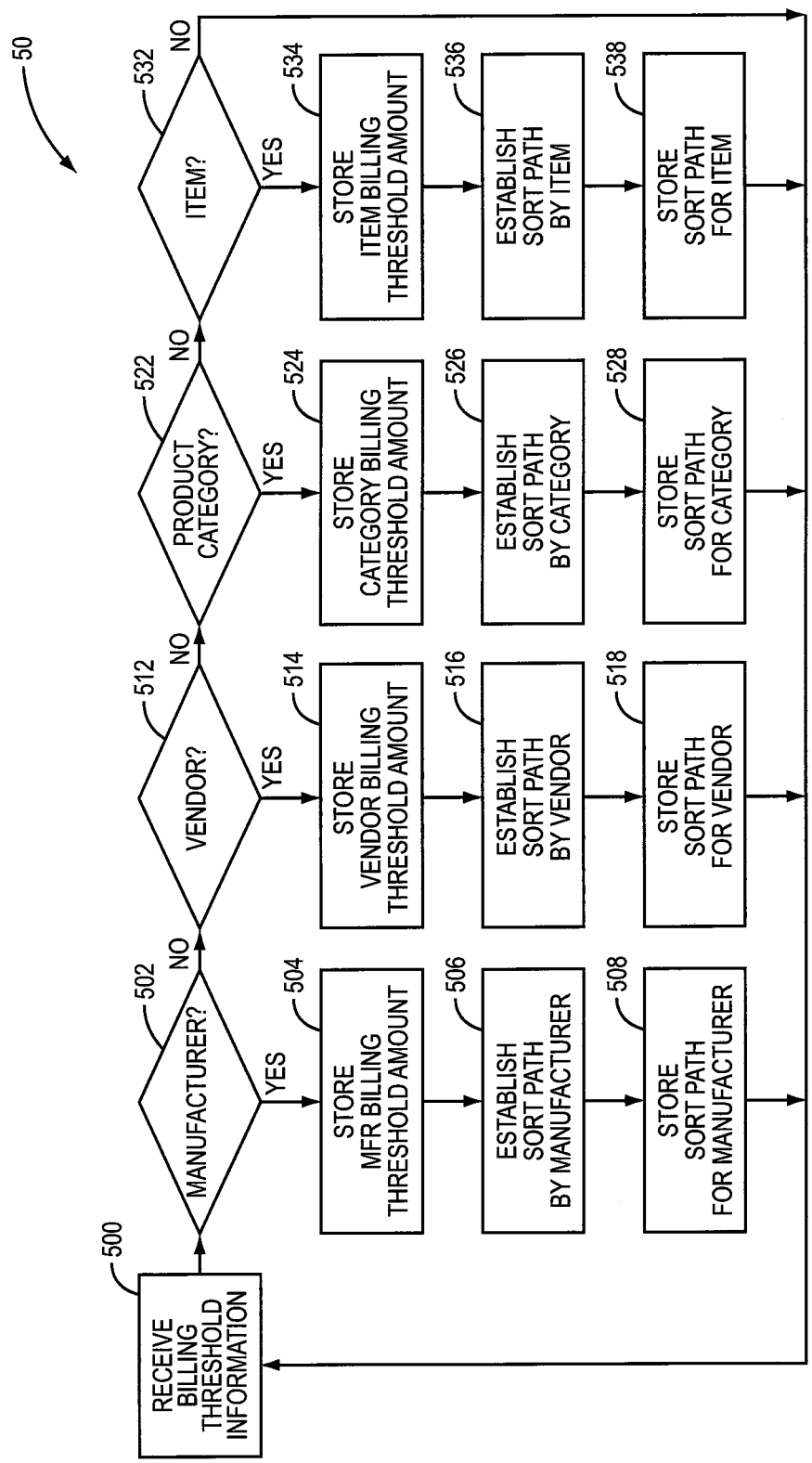
FIG. 5 is flow chart illustrating a process for establishing billing threshold group types and amounts for an exemplary embodiment of the present invention.

FIG. 5 is a flow chart illustrating a process 50 for establishing billing threshold group types and billing threshold amounts for an exemplary embodiment of the present invention. As can be seen from FIG. 5, different billing threshold group types may be established. In an exemplary embodiment, billing thresholds are established on the basis of the following attributes of a returned good: manufacturer, vendor, product category, which may be established by a vendor and/or manufacturer, and individual item.

In an exemplary embodiment of the process for establishing billing thresholds for returned goods, in block 500, billing threshold information is received and stored in a computer memory and processing control is transferred to block 502. The billing threshold information may be comprised of a billing threshold group type, e.g., a manufacturer billing threshold, information identifying a particular manufacturer and a specific billing threshold amount for that particular manufacturer.

In block 502, the process determines if the threshold to be established is a manufacturer billing threshold. If the threshold to be established is not a manufacturer billing threshold, processing control is transferred to block 512. If the threshold to be established is a manufacturer billing threshold, processing control is transferred to block 504. In block 504, the amount of the manufacturer billing threshold for a particular manufacturer is stored in a computer memory and processing control is transferred to block 506. The following table sets forth exemplary billing threshold amounts that may be established for exemplary manufacturers:

| Manufacturer | Billing Threshold Amount |
| --- | --- |
| Sony | $10,000 |
| Microsoft | $20,000 |
| Nike | $15,000 |
| Mattel | $10,000 |

Thus, for example, a manufacturer billing threshold amount for Sony may be $10,000. Returning to FIG. 5, in block 506, the process establishes sort path logic for returned products manufactured by the particular manufacturer for which a billing threshold is being established and processing control is transferred to block 508. Thus, for example, sort path logic is established so that returned goods manufactured by Sony are systematically assigned to a container associated with returned goods manufactured by Sony. In block 508, the sort path logic for that particular manufacturer is stored in a computer memory and processing logic is returned to block 500.

As described in more detail below, when a billing threshold is reached, the physical container associated with the sort path logic established for that billing threshold is systematically closed so that no more goods can be assigned to such container. An indication that the container has been closed is stored in a computer memory. The closing of such a container systematically initiates a process of establishing a new container associated with the sort path logic for the billing threshold. The closing of the container also initiates a process for creating an invoice for the returned goods and disposing of the returned goods in that closed container according to the predetermined instructions.

Continuing with FIG. 5, and as discussed above, if the threshold to be established is not a manufacturer billing threshold, processing control is transferred to block 512. In block 512, the process determines if the threshold to be established is a vendor billing threshold. If the threshold to be established is not a vendor billing threshold, processing control is transferred to block 522. If the threshold to be established is a vendor billing threshold, processing control is transferred to block 514. In block 514, the amount of the vendor billing threshold for a particular vendor is stored in a computer memory and processing control is transferred to block 516. The following table sets forth exemplary billing threshold amounts that may be established for exemplary vendors:

| Vendor | Billing Threshold Amount |
|---|---|
| Sony Games | $20,000 |
| Microsoft Electronics | $15,000 |
| Nike Apparel | $10,000 |
| Mattel Riding Toys | $15,000 |

In an exemplary embodiment, a vendor can be thought of as a division of a particular manufacturer, e.g., an exemplary manufacturer may be Sony and an exemplary vendor may be the Games division of Sony. Thus, for example, a vendor billing threshold amount for Sony-Games may be $20,000. Returning to FIG. 5, block 516, the process establishes sort path logic for returned products that are sold by the particular vendor for which a billing threshold is being established and processing control is transferred to block 518. Thus, for example, sort path logic is established so that returned goods sold by Sony-Games are systematically assigned to a container associated with returned goods sold by Sony-Games. In block 518, the sort path logic for that vendor is stored in a computer memory and processing logic is returned to block 500.

Continuing with FIG. 5, and as discussed above, if the threshold to be established is not a vendor billing threshold, processing control is transferred to block 522. In block 522, the process determines if the threshold to be established is a product category billing threshold. Product categories are established on a vendor-by-vendor basis, in an exemplary embodiment. If the threshold to be established is not a product category billing threshold, processing control is transferred to block 532. If the threshold to be established is a product category billing threshold, processing control is transferred to block 524. In block 524, the amount of the product category billing threshold for a particular product category is stored in a computer memory and processing control is transferred to block 526. The following table sets forth exemplary billing threshold amounts that may be established for exemplary product categories:

| Product Category | Billing Threshold Amount |
|---|---|
| Sony Games PlayStation | $8,000 |
| Microsoft Electronics Monitors | $15,000 |
| Nike Apparel Golf | $10,000 |
| Mattel Riding Toys Tractors | $15,000 |

An exemplary product category may be PlayStations, which are sold by the Games division of Sony. Thus, for example, a product category billing threshold amount for PlayStations may be $8,000. Returning to FIG. 5, block 526, the process establishes sort path logic for returned products that are in the particular product category for which a billing threshold is being established and processing control is transferred to block 528. Thus, for example, sort path logic is established so that returned goods that are in the PlayStation product category are systematically assigned to a container associated with returned goods that are in the PlayStation product category. In block 528, the sort path logic for that particular product category is stored in a computer memory and processing logic is returned to block 500.

Continuing with FIG. 5, and as discussed above, if the threshold to be established is not a product category billing threshold, processing control is transferred to block 532. In block 532, the process determines if the threshold to be established is an item billing threshold. Items are specific to a particular manufacturer, a particular vendor and a particular product category, in an exemplary embodiment. If the threshold to be established is not an item billing threshold, processing control is returned to block 500. If the threshold to be established is an item billing threshold, processing control is transferred to block 534. In block 534, the amount of the item billing threshold for a particular item is stored in a computer memory and processing control is transferred to block 536. The following table sets forth exemplary billing threshold amounts that may be established for exemplary items:

| Item | Billing Threshold Amount |
|---|---|
| Sony Games PlayStation PlayStation Personal | $8,000 |
| Microsoft Electronics Monitors 22" High Definition | $15,000 |
| Nike Apparel Golf Shirt | $10,000 |
| Mattel Riding Toys Tractors JD Electronic | $15,000 |

An exemplary item may be PlayStation Personal, which is in the PlayStation product category and which are sold by the Games division of Sony. Thus, for example, an item billing threshold amount for the PlayStation Personal item may be $8,000. Returning to FIG. 5, block 536, the process establishes sort path logic for returned products that are items for which a billing threshold is being established and processing control is transferred to block 538. Thus, for example, sort path logic is established so a returned good that is a PlayStation Personal item is systematically assigned to a container associated with a returned good that is a PlayStation Personal item. In block 538, the sort path logic for that particular item is stored in a computer memory and processing logic is returned to block 500.

FIG. 6 is a more detailed flow chart illustrating a process 60 for processing returned items in an exemplary embodiment of the present invention. As can be seen from FIG. 6, in block 602, a returned item is received (or may already have been received) at a reclamation facility and is identified using a product code scanner, for example. Information regarding the identified returned product is stored in a computer memory. Processing control is then transferred to block 604.

In block 604, the processor determines whether the returned item is a billing threshold item. A billing threshold item is an item for which a billing threshold rule has been established and stored in a computer memory. If the identified item is not a billing threshold item, processing control is returned to block 602. If the identified item is a billing threshold item, processing control is transferred to block 606.

In block 606, the process associates the identified item with the billing threshold rule for the item and processing control is transferred to block 608.

In block 608, the process logically assigns the identified item to a sort path, based upon the identification of the item and billing threshold rule associated with the identified item. The sort path to which the returned item is assigned is stored in a computer memory in association with the stored information identifying the returned item. Processing control is then transferred to block 610.

In block 610, the identified item is assigned to a particular container associated with the sort path to which the returned item has been assigned. An indication of the container to which the identified item is assigned is stored in a computer memory, and processing control is transferred to block 612.

In block 612, the process determines the volume of returned items that have been assigned to the same sort path to which the identified item has been assigned. This determination may be made by interrogating the computer memory to identify all returned items that have been assigned to closed containers and to determine the amount of returned items in the closed containers. Processing control is then transferred to block 614.

In block 614, the process determines whether a billing threshold has been reached for the identified item. The process would determine whether the billing threshold for the identified threshold item has been reached by determining the volume of all containers associated with the identified threshold item that are closed. In other words, more than one closed container may contain the same threshold item and each of such closed containers is accounted for in determining whether the billing threshold for the threshold item has been reached.

Returning to block 614, if a billing threshold for the identified item has not been reached, processing control is returned to block 602. If the billing threshold for the identified item has been reached, processing control is transferred to block 616.

In block 616, the process determines whether the container to which the identified item has been assigned is closed. If the container is not closed, processing control is transferred to block 618. In block 618, the process generates and transmits notifications to reclamation facility personnel instructing that the container be physically closed, and processing control is transferred to block 620.

Returning to block 616, if the process determines that the container to which the identified item has been assigned is closed, processing control is transferred to block 620.

In block 620, the process stores information indicating that the container to which the identified item has been assigned has been physically closed, and processing control is transferred to block 622.

In block 622, the process establishes a new container that is associated with the sort path with which the closed container was associated. The process stores in a computer memory information indicating that a new container has been established and also stores information associating the new container with the sort path with which the closed container was associated so that additional identified items can be assigned to the new container. Processing control is then transferred to block 624.

In block 624, the process creates an invoice for the items in the one or more closed containers containing threshold items for which the billing threshold has been reached. The invoice is generated and sent to a product vendor using conventional invoicing systems and processes. Processing control is then transferred to block 626.

In block 626, the process facilitates disposition of the returned items by sending notifications to reclamation facility personnel indicating that one or more closed containers contain returned items for which billing threshold has been reached. Such notifications may indicate that the one or more containers should be moved to a storage area and/or should be prepared for shipment or other disposition. Processing control is then returned to block 602.

Set forth below is the information that may be used to establish a billing threshold for a threshold item for an embodiment of the present invention. A threshold item may be a scanned item for which a billing threshold rule has been established. A scanned item may be invoiced by the threshold billing process if the item is in a closed container.

| Element Name | Description |
|---|---|
| Name | Name for current billing threshold rule. |
| Description | Description for current billing threshold rule. |
| Active | State of current billing threshold rule. "Yes" if billing threshold rule is Active and "No" if the billing threshold rule is Inactive. If "Active," rule is evaluated. If status is "Inactive," rule is not evaluated, but is still displayed in list of threshold rules for vendor. If status is "Removed," rule is not evaluated and is not displayed in list of threshold rules for vendor. |
| Carryover | Carryover state of the current billing threshold rule. "Yes" if billing threshold rule is marked for Carryover and "No" if billing threshold rule is not marked for Carryover. Threshold Carryover is an option for each billing threshold rule. During billing threshold rule setup, the default may be set to Carryover. If billing threshold rule is set to Carryover, items for which billing threshold has not been reached may be invoiced at end of a predefined period associated with a billing threshold that was not reached at least once during the predefined period. Threshold items that have not been invoiced and are associated with a billing threshold that was reached are not invoiced during the the relevant time period. |
| Billing Threshold Group Type | Billing Threshold Group Type for the current threshold rule. A billing threshold rule may have a group type that defines the group of threshold items. The set of group types may include: Manufacturer (i.e., a vendor group or an account payable for several vendors); Vendor; Vendor custom field, which may be populated with a department, product category, or other group type; and Item (based on vendor's SKU). |
| Vendor | Name of the Vendor that has been selected for use with the current billing threshold rule |
| Group | Name of the Group that has been selected for use with the current Billing Threshold Rule. |
| Level Type | Level Type for the current billing threshold rule. Two types of threshold levels may be: dollars defaulting to date and number of units defaulting to date. If Level Type is dollars defaulting to date, a specific dollar amount must be reached before items can be invoiced. At the end of a predefined period, threshold items that have not been invoiced will be invoiced (unless Carryover is selected for the threshold rule). If Level Type is number of units defaulting to date, a specific number of units must be reached before items can be invoiced. At the end of the period, threshold items that have not been invoiced will be invoiced (unless Carryover is selected for the threshold rule). |

| Element Name | Description |
| --- | --- |
| Level | Level for the current billing threshold rule; maybe expressed in a currency or quantity. |
| Modified | Date and time the billing threshold rule was last modified. |
| Modified By | User name of the person who last modified the billing threshold rule. |

As can be appreciated, the billing threshold rule information can be stored in a computer memory and in a relational database. A user interface may be provided for entering and saving in a computer memory billing threshold rule information. A user interface also may be provided for displaying and modifying billing threshold information. A user interface also may be provided for displaying information about billing threshold rules that may have been established. For example, such a user interface may display and group billing threshold rules for which invoices have been generated (because the billing threshold rule has been reached) or for which invoices have not been generated (because the billing threshold rule has not been reached). Such an interface may display the following information about the status of a billing threshold rule: period of time, level type, level, quantity of items scanned and assigned to a container, dollar valued scanned and assigned to a container, whether or not an invoice has been generated and the date and time of the status of the billing threshold rule.

Figure 7:
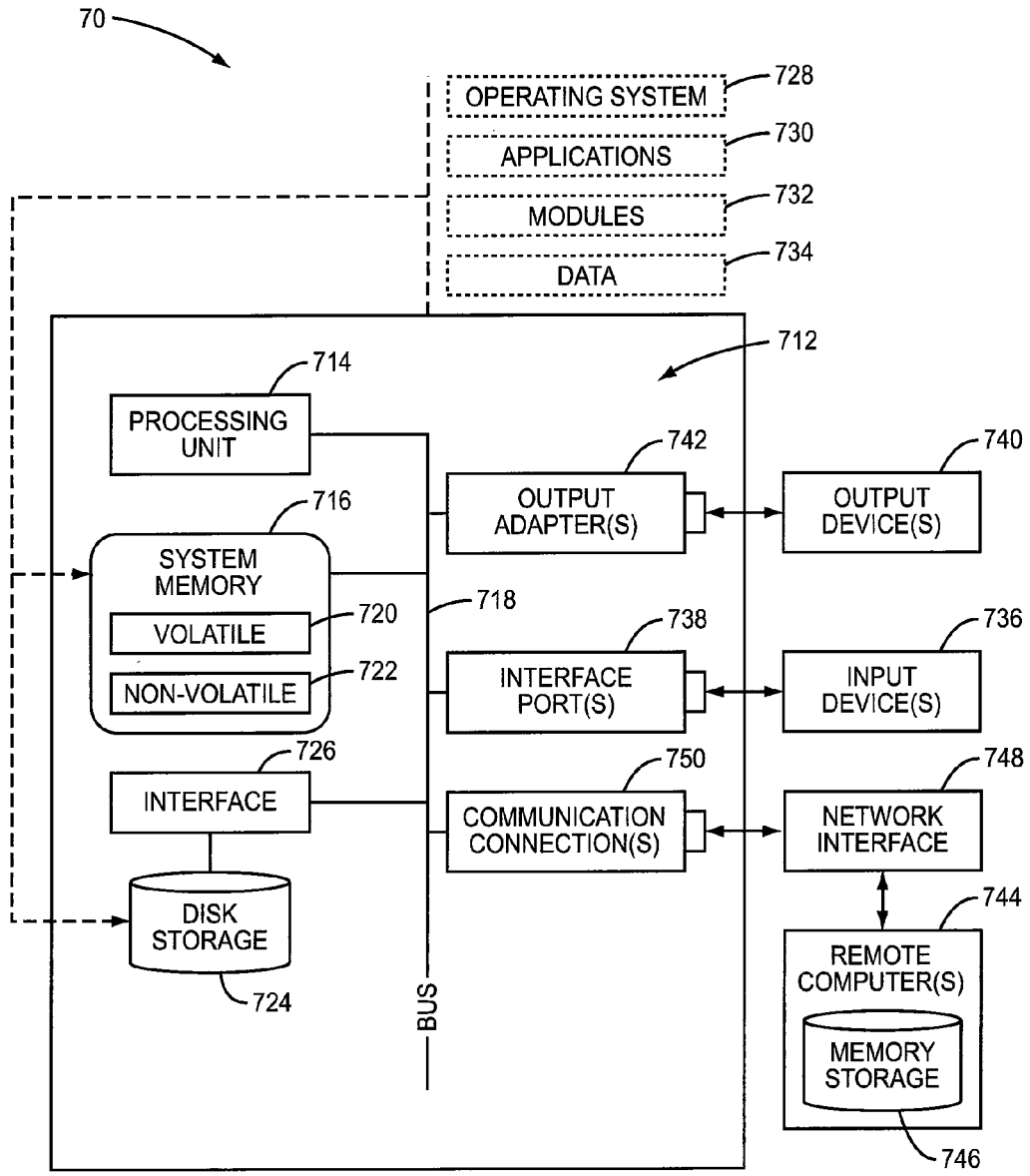
FIG. 7 is a diagram illustrating exemplary computer hardware and software to implement an embodiment of the invention.

FIG. 7 illustrates exemplary hardware and software components that may be used to implement an embodiment of the present invention. While aspects of the invention may be described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 70 is an exemplary suitable operating environment and does not limit the scope of the invention. Other known computer systems, environments, and/or configurations may be suitable for use with the invention.

Referring to FIG. 7, an exemplary environment 70 for implementing various aspects of the invention includes a computer 712, which includes a processing unit 714, a system memory 716, and a system bus 718. The system bus 718 couples the system components including, the system memory 716 to the processing unit 714. The processing unit 714 can be any of various processors available. The system bus 718 can be any of the available types of bus structures using any variety of available bus architectures. The system memory 716 includes volatile memory 720 and nonvolatile memory 722.

Computer 712 also may include removable/nonremovable, volatile/nonvolatile computer storage media, for example, a disk storage 724. Disk storage devices 724 may be connected to the system bus 718 via removable or non-removable interface 726.

FIG. 7 also illustrates software that allows interaction between users and computer resources, which may include an operating system 728. System applications 730 are allocated resources by operating system 728 through program modules 732 and program data 734 stored either in system memory 716 or on disk storage 724. Aspects of the present invention may be implemented with various operating systems or combinations of operating systems.

A user enters commands or information into computer 712 through input devices 736, which connect to processing unit 714 through the system bus 718 via interface ports 738. Input devices may include scanners, optical, radio frequency identification, etc., which can be used to identify returned items so that they can be further processed. Output devices 740 use some of the same type of ports as input devices 736. Output adapter 742 may be provided because some output devices 740 like monitors, speakers and printers require special adapters. Other devices and/or systems of devices provide both input and output capabilities such as remote computers 744.

Computer 712 can operate in a networked environment using logical connections to one or more remote computers, such as remote computers 744. The remote computers 744 can be a personal computer, a server, a router, a network PC, a workstation, a microprocessor based appliance, a peer device or other common network node, which may include many or all of the elements of computer 712. While only a single memory storage device 746 is shown, remote computers 744 may be logically connected to computer 712 through a network interface 748 and physically connected via communication connection 750.

The foregoing description include exemplary embodiments of aspects of the present invention. One of ordinary skill in the art will recognize that many further combinations and permutations of aspects of the present invention are possible. The present invention is intended to include all such alterations, modifications and variations that are within the claims.

What is claimed is:

1. A computer implemented method for billing a product vendor for returned items, comprising:
    establishing and storing in a computer memory a plurality of billing threshold rules, each of the plurality of billing threshold rules being associated with at least one of a plurality of returned items and being comprised of a billing threshold amount;
    identifying a returned item via a computer processor and storing in the memory an identity of the returned item;
    determining via the computer processor a billing threshold rule associated with the returned item;
    assigning via the processor the returned item to a container based on the billing threshold rule associated with the returned item;
    storing in the memory an indication of the container to which the returned item has been assigned;
    determining via the processor when the billing threshold amount for the returned item has been reached;
    when the billing threshold amount for the returned item has been reached, determining via the processor a status of the container to which the returned item has been assigned;
    after the billing threshold amount for the returned item has been reached, generating and transmitting to a reclamation facility via the processor a notification to physically close the container; and
    generating via the processor an invoice to the product vendor for the returned items for which the billing threshold amount has been reached.

2. The method of claim 1, wherein the step of establishing one or more billing threshold rules is further comprised of:
    establishing and storing in the computer memory a billing threshold type for each of the plurality of billing threshold rules, each of the billing threshold types being a manufacturer, a vendor, a product category or an item.

3. The method of claim 1, wherein the billing threshold amount is a number of returned items or a monetary amount of returned items.

4. The method of claim 1, further comprising:
storing in the computer memory an indication that the container to which the returned item was assigned is closed; and
establishing via the processor a new container and storing in the computer memory an association between the new container and the billing threshold rule with which the closed container was associated.

5. The method of claim 1, further comprising:
facilitating via the processor transmission of the invoice to the product vendor.

6. The method of claim 1, further comprising:
facilitating via the processor the shipment of the returned items for which the billing threshold amount has been reached to a specified destination.

7. A computer system for billing a product vendor for returned items, comprising:
a computer memory for
storing a plurality of billing threshold rules, each of the plurality of billing threshold rules being associated with at least one of a plurality of returned items and being comprised of a billing threshold amount;
a computer processor for
identifying a returned item and storing in the memory an identity of the returned item;
determining a billing threshold rule associated with the returned item;
assigning the returned item to a container based on the billing threshold rule associated with the returned item;
storing an indication of the container to which the returned item has been assigned;
determining when the billing threshold amount for the returned item has been reached;
when the billing threshold amount for the returned item has been reached, determining a status of the container to which the returned item has been assigned;
after the billing threshold amount for the returned item has been reached, generating and transmitting to a reclamation facility a notification to physically close the container; and
generating an invoice to the product vendor for the returned items for which the billing threshold amount has been reached.

8. The method of claim 7, wherein the one or more billing threshold rules is further comprised of:
a billing threshold type for each of the plurality of billing threshold rules, each of the billing threshold types being a manufacturer, a vendor, a product category or an item.

9. The system of claim 7, wherein the billing threshold amount is a number of returned items or a monetary amount of returned items.

10. The system of claim 7, further comprising:
the computer memory storing an indication that the container to which the returned item was assigned is closed; and
the processor establishing a new container and the computer memory storing an association between the new container and the billing threshold rule with which the closed container was associated.

11. The system of claim 7, further comprising:
the processor facilitating the transmission of the invoice to the product vendor.

12. The system of claim 7, further comprising:
the processor facilitating the shipment of the returned items for which the billing threshold amount has been reached to a specified destination.

13. A non-transitory computer readable medium having stored thereon instructions for billing a product vendor for returned items, which when executed by a processor, cause the processor to:
establish and store in a computer memory a plurality of billing threshold rules, each of the plurality of billing threshold rules being associated with at least one of a plurality of returned items and being comprised of a billing threshold amount;
identify a returned item via a computer processor and store in the memory an identity of the returned item;
determine via the computer processor a billing threshold rule associated with the returned item;
assign via the processor the returned item to a container based on the billing threshold rule associated with the returned item;
store in the memory an indication of the container to which the returned item has been assigned;
determine via the processor when the billing threshold amount for the returned item has been reached;
when the billing threshold amount for the returned item has been reached, determine via the processor a status of the container to which the returned item has been assigned;
after the billing threshold amount for the returned item has been reached, generate and transmit to a reclamation facility via the processor a notification to physically close the container; and
generate via the processor an invoice to the product vendor for the returned items for which the billing threshold amount has been reached.

14. The non-transitory computer readable medium of claim 13, wherein the instructions stored thereon further cause the processor to:
establish and store in the computer memory a billing threshold type for each of the plurality of billing threshold rules, each of the billing threshold types being a manufacturer, a vendor, a product category or an item.

15. The non-transitory computer readable medium of claim 13, wherein the billing threshold amount is a number of returned items or a monetary amount of returned items.

16. The non-transitory computer readable medium of claim 13, wherein the instructions stored thereon further cause the processor to:
store in the computer memory an indication that the container to which the returned item was assigned is closed; and
establish via the processor a new container and store in the computer memory an association between the new container and the billing threshold rule with which the closed container was associated.

17. The non-transitory computer readable medium of claim 13, wherein the instructions stored thereon further cause the processor to:
facilitate via the processor transmission of the invoice to the product vendor.

18. The non-transitory computer readable medium of claim 13, wherein the instructions stored thereon further cause the processor to:
    facilitate via the processor the shipment of the returned items for which the billing threshold amount has reached to a specified destination.

\* \* \* \* \*